Aug. 14, 1928.                    1,680,511
A. H. G. FOKKER
UNDERCARRIAGE FOR AIRCRAFT
Filed Sept. 10, 1925
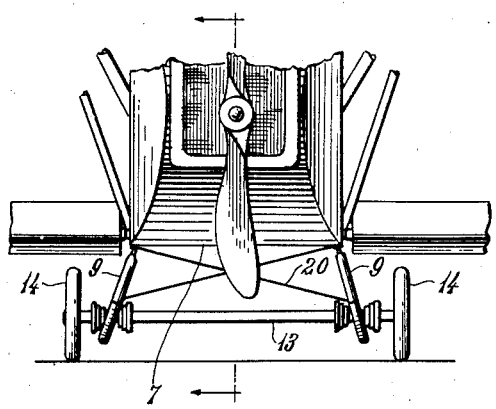
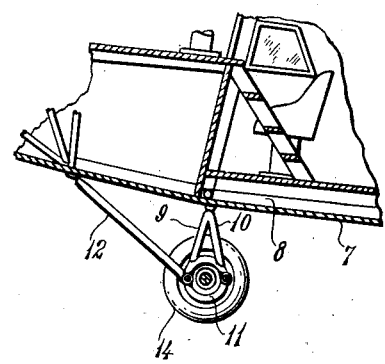
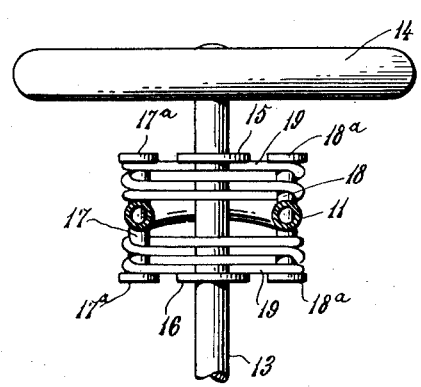
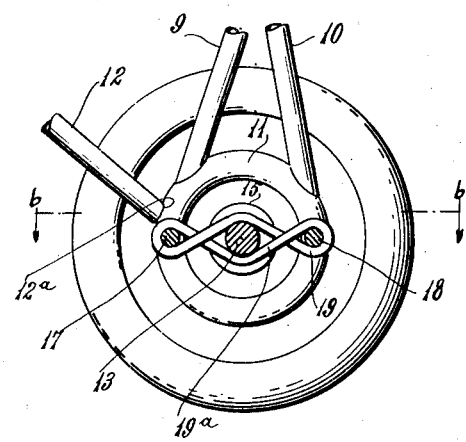
INVENTOR
Anthony H. G. Fokker
ATTORNEY Patented Aug. 14, 1928.

1,680,511

UNITED STATES PATENT OFFICE.

ANTHONY HERMAN GERARD FOKKER, OF AMSTERDAM, NETHERLANDS, ASSIGNOR TO ATLANTIC AIRCRAFT CORPORATION, A CORPORATION OF NEW JERSEY.

UNDERCARRIAGE FOR AIRCRAFT.

Original application filed May 25, 1923, Serial No. 641,324. Divided and this application filed September 10, 1925. Serial No. 55,444.

This invention relates generally to aircraft and is more especially directed to improvements in the landing gears or undercarriages of airplanes, as disclosed in my co-pending application for United States Letters Patent, filed May 25, 1923, Serial No. 641,324, of which the present application is a division.

As is well known, an airplane landing gear or undercarriage must be of a light and strong construction, and to efficiently serve its purpose, should be capable of absorbing or dissipating the landing shocks, irrespective of their direction, so as to prevent transmission of the resultant detrimental forces to the fuselage and its components.

Various types of undercarriages have been devised to attain the desired end, but it has been found that while one or another may respond to some of the requirements, it fails to meet others that are equally important, so that at the present time there is no undercarriage structure which combines lightness and strength with a range of flexibility which enables it to efficiently function not only in absorbing the impact and rebound shocks, but in taking the side loads due to making a landing while the airplane is drifting sidewise.

The primary object of this invention is to generally increase the efficiency of airplane landing gears or undercarriages, by providing means for effectively overcoming the limitations which are inherent to structures of existing types.

More specifically, it is an object of my invention to provide a light strong undercarriage of a simple and economical construction, which will effectively take or absorb the impact and rebound landing shocks and the side loads which may develop from landing while the airplane is drifting sidewise or rolling, thereby preventing the transmittal of the resultant destructive forces to the airplane structure.

It is also an object of my invention to provide an undercarrige having the aforesaid characteristics, in which the landing appendages are carried by an axle or member yieldably or floatably supported for universal movement in response to the loads imposed thereupon, under various conditions of landing.

Other objects and advantages flowing from the practicing of my invention will present themselves as the description proceeds, and I would have it clearly understood that I reserve unto myself all rights to the full range of equivalents, both in structure and in use, to which I may be entitled under my invention in its broadest aspect.

For the purposes of the present disclosure I have elected to illustrate and describe a preferred embodiment of my invention, it being manifest that changes in the details and arrangement of parts of the structure, may be effected without departing from the spirit and scope of my invention as defined by the appended claims.

In the accompanying drawings:

Figure 1 is a front elevation of a portion of an airplane, embodying an undercarriage made in accordance with my invention;

Figure 2 is a longitudinal section on the line $a$—$a$ of Figure 1;

Figure 3 is an enlarged view in elevation of a section of the landing gear as seen in Figure 2, and Figure 4 is a view taken on the line $b$—$b$ of Figure 3.

Referring now to the drawings in detail, in which like characters of reference are employed to designate similar parts in the several views, 7 indicates the airplane fuselage and 8 the longerons thereof, to which the undercarriage or landing gear is attached as hereinafter described.

As will be observed, each of the main or supporting struts comprises two preferably tubular streamlined members 9 and 10, which converge upwardly to form an inverted V, the apex of which may be a suitable fitting within which the ends of the said members may be permanently fixed, as by welding.

Supported from the spaced lower ends of the members 9 and 10, to which it is integrally united or joined, as by welding, is a preferably annular member or ring 11, which may be formed of streamlined metal tubing, the obliquely disposed fore and aft bracing struts 12 being similarly fixed thereto, as indicated at 12ª.

Concentrically located within the annular member or ring 11, is an axle 13 of the rigid so-called continuous type, the extremities of which are provided with spindles or the like to receive the landing appendages, which, in the present showing, are the wheels 14.

Adjacent to each end of the axle 13, I provide a pair of spaced preferably annular collars or flanges 15 and 16, which may be discs apertured to fit upon the axle for jointure thereto by welding.

Projecting laterally from each side of the ring or annular member 11, at diametrically opposite points thereon, are the stubs or arms 17 and 18, which may be of tubing, the respective ends thereof having disc-like flanges or heads 17a and 18a. These stubs or arms may be of any practical form and united to the ring or member 11 in any suitable manner.

The axle 13 is yieldably suspended within the ring or annular member 11, as aforesaid, by means of the rubber or elastic cord 19 which is looped or wrapped about the respective stubs or arms 17 and 18 and the axle 13, between the cooperating retaining flanges 15, 16, 17a and 18a thereof, as clearly shown in Figures 3 and 4.

In the formation of the loops in engagement with the stubs and axle respectively, it will be noted that the cord is crossed upon itself between the former and the latter, the intermediate or axle engaging loops 19a cooperating to provide a bearing which affords a strong and ample support for the axle, the tension of the cord serving to normally maintain the axle and the stubs in the same horizontal plane, with the axle concentric to the ring or annular member 11, as aforesaid.

From the foregoing, it will be seen that I have provided an undercarriage or landing gear in which the axle is supported solely by the rubber or elastic cord. This floatable resilient mounting permits universal movement of the axle with relation to the ring or annular member, the axle being bodily reciprocable radially and longitudinally within the ring, under the yielding restraint of the cord, so that the impact and rebound shocks are completely absorbed or dissipated.

It is evident that, as the axle and ring are capable of relative movement, laterally of the airplane, the side loads resulting from the wheels or landing appendages striking the ground while the airplane is rolling or drifting sidewise when making a landing, will be taken by the elastic cord, the destructive side thrusts upon the wheels or the like, which frequently result in their collapse in present undercarriage structures, being rendered negligible.

The relative universal movement of the axle and ring or annular member 11, as described, prevents the transmission of detrimental forces to the airplane structure in landing, it being apparent that the tension of the rubber cord is taken by the stubs or arms 17 and 18, thereby relieving the struts of the attendant bending stresses.

By employing inverted V struts, the members of which have a single point of jointure with the underbody of the fuselage, the weight of the supported structure is equally distributed to the cooperating parts of the undercarriage. These bifurcated struts and the struts 12 which impart the necessary fore and aft rigidity to the undercarriage, may be attached to the fuselage by any suitable means, such, for instance, as the well-known ball and socket connection, employed in airplane construction, the structure being laterally braced by the usual diagonal wires 20.

While I have described my invention with reference to the specific showing, it broadly comprehends an undercarriage which will attain the objects hereinbefore set forth and in which the axle or landing appendage support is floatably mounted so as to be capable of universal movement with relation to a fixed member of the structure.

I claim:

1. An undercarriage for an airplane having a full floating axle capable of yielding in all directions to absorb landing, rebound and side load shocks.

2. An airplane undercarriage embodying supporting and bracing struts, a rigid member connecting said struts at their lowermost ends, windings of rubber cord stretched upon said member and an axle mounted within said windings which function as the sole support for said axle.

3. An airplane undercarriage embodying bifurcated supporting struts, a rigid ring connected thereto, an axle concentric with said ring, and means for connecting said axle and said ring for relative universal movement.

4. An airplane undercarriage having members adapted for connection to the airplane, an axle and windings of rubber cord forming the sole connection between said axle and said members, whereby said axle is floatably suspended from said members for universal movement.

5. An airplane undercarriage comprising inverted V-shaped supporting struts, means for movably connecting the apex of each of said struts to an airplane fuselage, a rigid ring integrally united with the divergent ends of the strut members, a rigid axle concentric with said ring and means for connecting said axle to said ring, said means including lateral projections on said rings, and rubber cord passed about said projections and said axle, said axle thereby being floatably suspended within said rings.

6. An airplane undercarriage embodying rigid supporting members adapted for connection to the airplane, an axle and elements capable of yielding in every direction fixed to said members and in engagement with said axle, said elements functioning as the sole support for said axle.

7. An airplane undercarriage having an axle supported solely within loops formed by rubber cord held in tension.

8. An airplane undercarriage embodying supporting struts, means for connecting the struts to the fuselage of an airplane, a rigid member supported from said struts, an axle associated with said member and means of connection between said member and said axle adapted to yield in all directions, whereby said axle will be capable of relative bodily movement.

9. An airplane undercarriage comprising members adapted for connection to the fuselage, an axle and resilient means connected to said axle and to said members, said means functioning as the sole support of said axle.

10. An airplane undercarriage embodying rigid supporting members adapted for connection to the airplane and an axle floatably suspended from said supporting members.

ANTHONY H. G. FOKKER.